United States Patent [19]

Crace

[11] Patent Number: 5,427,805
[45] Date of Patent: Jun. 27, 1995

[54] BRIQUETTE CONTAINING AROMATIC PELLETS

[75] Inventor: Robert J. Crace, Brentwood, Tenn.

[73] Assignee: Hickory Specialties, Inc., Brentwood, Tenn.

[21] Appl. No.: 98,898

[22] Filed: Jul. 29, 1993

[51] Int. Cl.$^6$ .................... A23B 4/044; A23B 4/048
[52] U.S. Cl. .................... 426/314; 44/504; 44/550; 44/559; 44/590
[58] Field of Search .............. 426/314; 44/550, 559, 44/590, 504

[56] References Cited

U.S. PATENT DOCUMENTS

| | | |
|---|---|---|
| 53,779 | 4/1866 | Bulkley . |
| 1,668,660 | 5/1928 | Shimamoto . |
| 2,341,377 | 2/1944 | Hinderer . |
| 2,916,365 | 12/1959 | Smith . |
| 3,227,530 | 1/1966 | Levelton . |
| 3,395,003 | 7/1968 | Alexander . |
| 3,492,134 | 1/1970 | Brümmendorf . |
| 3,709,700 | 1/1973 | Ross . |
| 4,102,653 | 7/1978 | Simmons et al. . |
| 4,787,914 | 11/1988 | Crace . |
| 4,818,249 | 4/1989 | Barrett . |
| 5,096,727 | 3/1992 | Crace . |

OTHER PUBLICATIONS

The American College Dictionary, Ed. by Barnhart, C., Random House, New York, 1970, p. 895.

*Primary Examiner*—Donald E. Czaja
*Assistant Examiner*—Curtis E. Sherrer
*Attorney, Agent, or Firm*—Vorys, Sater, Seymour & Pease

[57] ABSTRACT

Briquettes capable of sustained emission of aromatic volatiles during cooking of food over a heated bed of briquettes comprise a bonded combustible or non-combustible matrix containing within the matrix at least one pellet of combustible aromatic material. The briquettes are preferably conventional charcoal briquettes containing a plurality of pellets of compressed bonded wood. The wood is preferably a flavoring wood such as hickory. The invention also encompasses a method of imparting flavor to food comprising cooking food over a heated bed of the briquettes of the invention.

18 Claims, No Drawings

BRIQUETTE CONTAINING AROMATIC PELLETS

BACKGROUND OF THE INVENTION

Field of the Invention

This invention relates to briquettes used in grills for cooking food over a bed of coals or the like and more particularly to briquettes containing aromatic pellets to provide volatile agents for flavoring food cooked over such briquettes.

Brief Description of the Prior Art

Although modern civilization has brought great convenience to the preparation and cooking of food, traditional methods of cooking have remained popular and have even been considered to be, in some respects at least, superior to newer techniques. This is particularly true in preparation of meat, where cooking over an open fire or a bed of coals has long been considered to give to the meat unique and desirable flavor, color and texture. Both in backyard "barbecue" cooking and in restaurants, meats prepared by grilling over open coals are often preferred for the color and flavor imparted by such cooking. Special woods have often been employed to give particular flavors to the meat. Thus, aromatic woods such as hickory, mesquite, apple, oak, maple, alder, cherry, sassafras, birch, ash, willow and some pines have been considered to provide characteristic flavors to the meat. Other aromatic materials such as spice hulls, nutshells, spices and mixtures thereof have also been added to the bed of coals or placed within the grill to impart flavor to the food as it is being cooked.

However, the use of wood for open cooking has a number of drawbacks. Relatively large amounts of wood have to be used to prepare a bed of coals suitable for grilling or cooking. Because seasoned firewood has a naturally high rate of burning, it burns, when first ignited, with abundant flames, which must be allowed to die down before a bed of coals suitable for cooking is available. This initial burning produces large volumes of smoke which can be unpleasant in confined locations such as a back yard or in the kitchen of a restaurant. Furthermore, it is the wood volatiles in the smoke that impart the characteristic color and flavor to the meat, and the wood fire does not release these volatiles in an efficient manner. In the initial stages of the fire, the flames are too intense for proper cooking, yet it is just at this time that the flavoring smoke is being evolved. Even if the cooking were attempted at this stage of the wood fire, the evolution of smoke and wood volatiles occurs at a rate too great for the meat to absorb them efficiently, and accordingly, a large fraction of the wood volatiles is wasted.

In order to overcome the problems inherent in cooking over a wood fire, it has long been customary to cook meats over a bed of coals prepared from charcoal. The charcoal burns with an essentially flameless fire that is easily controlled. Furthermore, the charcoal can be supplied in the form of briquettes molded from powdered charcoal that can be made from waste material such as sawdust. Such briquettes are uniform in size and properties and have come to be universally used for grilling meats over a charcoal fire. However, the pyrolysis of wood to make the charcoal removes most of the wood volatiles that are desired for flavoring meat. Consequently, meat prepared over a charcoal fire does not receive the special flavors imparted by the volatiles associated with a particular type of wood. Accordingly, even special charcoal such as that prepared from hickory wood cannot be the equivalent of the wood itself for imparting the characteristic hickory-smoked flavor to meats.

In order to obtain the advantageous properties of food cooked over open coals with the convenience of more modern sources of heat, non-combustible briquettes have been developed which are heated by a gas flame or electric resistance heating element in a gas or electric grill to simulate the hot coals of a charcoal fire and enable food to be cooked by the same desirable radiant heat. Such briquettes may be manufactured by simply crushing a durable rock such as basalt or "lava" to a suitable size or by molding from an inert filler such as clay or the like bonded with a heat-resistant binder such as portland cement. Certain briquettes have also been fabricated that combine both a combustible ingredient such as charcoal with a non-combustible ingredient such as clay to produce a briquette that can burn to provide heat by itself, yet remain intact after the combustible material has been used up to serve as a permanent briquette in gas or electrically heated grills. Such briquettes are disclosed in U.S. Pat. No. 4,787,914, to Crace.

However, combustible briquettes made from charcoal or noncombustible permanent briquettes used with gas or electric grills either do not supply wood volatiles or other volatile aromatic flavoring agents which are the agents that impart to the grilled meat its characteristic smoked flavor and color, or do not supply them in amounts sufficient for satisfactory flavoring.

A number of expedients have been tried in attempts to combine the flavoring properties of aromatic woods with the advantages of charcoal briquettes or permanent briquettes for open cooking of meats as well as to economize on the amount of wood needed.

Hinderer, U.S. Pat. No. 2,341,377, discloses a briquette comprising powdered charcoal and comminuted aromatic wood. The powdered material is mixed with a binder, molded into a briquette and hardened. However, this combination of powdered charcoal and comminuted wood has certain drawbacks. The individual particles of wood are subjected to the high temperatures of the charcoal flame as soon as it reaches them. Accordingly, the individual particles of wood tend to be rapidly combusted with accompanying destruction of the wood volatiles. Furthermore, the formulation of the briquette has to be specially adjusted to provide for binding of a briquette that comprises a substantial fraction of wood particles, and materials have to be added to prevent the wood particles from burning too rapidly. The physical integrity of the briquette as it burns is also affected by the rapid burning of the wood particles, and adjustments may have to be made to the binder, particularly if briquettes incorporating different proportions of comminuted wood are to be manufactured.

An alternative procedure, disclosed by Smith, U.S. Pat. No. 2,916,365, is to coat blocks of aromatic wood with flame retarding materials to control the rate of combustion. This procedure has the evident economic disadvantages of any method that starts with wood in any form to prepare a bed of coals and is wasteful of the aromatic wood. Furthermore, the preparation of wood blocks of appropriate size and shape from natural material is prohibitively expensive, as compared with preparation of charcoal briquettes from waste material such as sawdust.

U.S. Pat. No. 4,102,653, to Simmons et al., discloses an aromatic wood product for use in barbecuing foods which comprises wood impregnated or coated with combustion-retarding materials such as alkali metal salts, borax and the like to control the rate of release of wood volatiles for proper smoking of the food. The flame inhibition process may be applied to chunks, blocks or small logs of wood or to comminuted woods which are formed into briquettes. Simmons' products are intended to be used in association with conventional fuels such as nonaromatic wood, charcoal and gas. They are not capable of being used alone as a source of heat for cooking food on an open grill.

In all embodiments of Simmons' invention, the rate of emission of wood volatiles and the ultimate duration of the emission can only be determined by controlling the rate of combustion of the aromatic wood. The impregnation process itself introduces a complex step into the manufacture of the articles, whether it be used to impregnate blocks of wood to be used separately or comminuted wood to be incorporated into briquettes. Briquettes that are made entirely of comminuted wood and a binder have to be formulated or densified by compression so that the burning rate is controlled to release wood volatiles over the period of cooking. Furthermore, Simmons' coated or impregnated wood blocks suffer from the economic disadvantages of the coated blocks of Smith, U.S. Pat. No. 2,916,365, discussed above.

The Simmons patent does not disclose a combustible briquette that can alone provide both heat and wood volatiles, nor a permanent partially combustible or non-combustible briquette that can supply wood volatiles when heated by an extraneous source of heat, e.g., in a gas-fired or electric grill. While some embodiments of Simmons' briquettes are intended to have some structural integrity after combustion, they are not disclosed as being capable of functioning as permanent briquettes in gas grills and the like.

Crace, U.S. Pat. No. 5,096,727, discloses a composition containing aromatic woods and/or spices which is placed in a container between a bed of coals and the meat being cooked. The aromatic ingredients of the composition are vaporized by the heat of the coals and impart flavor to the meat. While this is an effective flavoring technique, it requires a separate composition and an additional piece of apparatus in the grill.

Accordingly, a need has continued to exist for an economical briquette, simple to manufacture, that can serve as a sole source of volatile aromatic agents for flavoring meat cooked over a bed of such briquettes.

SUMMARY OF THE INVENTION

This need has now been met by briquettes according to this invention which comprise a bonded combustible or non-combustible matrix containing within the matrix at least one pellet of a combustible material capable of generating a volatile flavoring substance. Preferably, the combustible material is an aromatic wood.

The invention also encompasses a method of imparting flavor to food comprising cooking food over a heated bed of the briquettes of the invention.

Therefore, it is an object of this invention to provide an improved briquette capable of supplying volatiles for flavoring meat cooked over such a briquette.

A further object is to provide a briquette containing wood pellets.

A further object is to provide a briquette containing pellets of a combustible aromatic material capable of providing a volatile flavoring agent.

A further object is to provide a charcoal briquette containing a flavoring wood which can provide wood volatiles.

A further object is to provide a charcoal briquette which is capable of a sustained release of wood volatiles over a relatively long period of time as the briquette is consumed.

A further object is to provide a single charcoal briquette that can serve as fuel for grilling food and at the same time supply wood volatiles for imparting flavor to the food.

A further object is to provide a non-combustible briquette containing a flavoring wood which can provide wood volatiles.

A further object is to provide a partially combustible permanent briquette containing a flavoring wood which can provide wood volatiles.

A further object is to provide a method of flavoring food by exposing it during cooking to wood volatiles emitted from pellets of compressed wood contained in briquettes.

Further objects of the invention will become apparent from the description of the invention which follows.

DETAILED DESCRIPTION OF THE INVENTION AND PREFERRED EMBODIMENTS

The briquettes of the invention are intended to be used in cooking of foods, particularly meat, on a grill over a bed of coals when it is desired to impart to the meat the flavor and color provided by exposure to volatile flavoring materials during cooking. To this end the briquettes comprise a bonded matrix containing pellets of compressed and bonded wood or other combustible materials that generate aromatic flavoring volatiles. These pellets of aromatic combustibles are pyrolyzed and burned when subjected to the heat generated either by combustion of the briquette itself or applied to the briquette from an external source, e.g., in a gas or electrically heated grill. As the pellets in the briquette are successively pyrolyzed and burned they provide a sustained release of volatile flavoring materials during at least a substantial portion of the time that the meat is being cooked by heat radiated from the briquettes.

It is preferred that the aromatic pellets included in the briquettes of the invention be pellets of compressed wood. Such wood pellets are made from natural wood compressed and bonded by pressure, possibly with the use of heat, to form dense solid pellets of wood. Suitable pellets may be formed by compression of sawdust or wood particles as described in Brummendorf, U.S. Pat. No. 3,492,134. Suitable pellets of compressed and bonded wood can also be formed by extrusion of wood chips and the like through a die under high pressure. Under these conditions the natural resins in the wood are usually sufficient to bond the wood into a dense pellet. Pellets of extruded wood may conveniently have diameter of about one-fourth to about one-half inch (6–13 mm) in diameter and a length from about one-fourth inch (6 mm) to about 1½ inches (38 mm). A preferred size for the wood pellets is about one-fourth inch (6 mm) in diameter by one-half to one inch (13–25 mm) in length.

The compressed wood pellets used in the briquettes of the invention may be prepared from any wood capable of providing wood volatiles to impart flavor and color to the meat cooked over the briquettes, Accordingly, hickory, mesquite, apple, oak, maple, alder, cherry, sassafras, birch, ash, willow and pine, among others, may be used in the wood pellets. Hickory is a preferred wood for use in the pellets because of the widely appreciated flavor it imparts to cooked meat.

Combustible and vaporizable aromatic ingredients such as comminuted nuts, nutshells, spice hulls, spices and the like can also be formed into pellets suitable for use in the briquettes of this invention. Such pellets can be prepared by mixing the aromatic ingredient, e.g., nuts, nutshells, spice, spice hulls and the like with a binder such as starch which is subsequently gelatinized by water and heat, and compressed or molded into pellets which are subsequently hardened by drying. A clay binder, e.g., hydrated montmorillonite, western bentonite, kaolinite, ball clay or the like can also be used provided that the amount used does not prevent the combustion of the aromatic material and the escape of the volatiles generated thereby. Typical nuts whose meat or shells can be used in the briquettes of the invention include hickory nuts, walnuts, pecans, and the like.

The bonded matrix which contains the aromatic pellets may be a conventional bonded charcoal briquette, a totally noncombustible briquette, or a partially combustible briquette.

The conventional charcoal briquettes which can serve as a matrix for containing the aromatic pellets are generally conventional briquettes formed by molding a mass of powdered charcoal together with a binder and subsequently hardening the briquette by a baking process that cures the binder.

Typically conventional charcoal briquettes suitable for use as the briquettes of this invention generally comprise about 40 percent by weight of charcoal, 20 percent limestone, 10 percent starch and 30 percent of either lignite or anthracite coal. The briquettes may also include about 2 percent of nitrate, e.g., sodium nitrate or potassium nitrate, as an oxidizer and about 0.5 percent of borax as a slicking agent. While such a composition is typical of current commercial charcoal briquettes, those skilled in the art will understand that any formula containing a substantial proportion of charcoal to burn and provide heat for cooking is suitable.

In manufacturing such briquettes, all ingredients, including the charcoal, are provided in powdered form and are thoroughly mixed with enough added water to gelatinize the starch, when heated, to serve as a binder. After mixing the ingredients are formed by any conventional means into briquettes. For example, the mass may be extruded, formed in dies by a stamping press or the like. The most common method of forming the briquettes is to compress the moistened briquette mix between a pair of rolls having matched depressions in their peripheries of proper shape to form the conventional "pillow-shaped" briquettes. The moist and compressed briquettes so prepared have enough green strength to be transported through a drying oven where the binder cures and dries to form a hardened briquette suitable for commercial distribution.

Non-combustible briquettes may be prepared by conventional techniques, well known to those skilled in the art. For example, a briquette may be prepared by mixing clay and/or sand with portland cement, adding enough water to provide a moldable composition, molding briquettes from the composition and allowing them to harden by the conventional hydration of the cement.

Partially combustible briquettes may be prepared by adding a substantial amount of a non-combustible material, e.g., clay, to a charcoal briquette of generally conventional composition. Such briquettes will burn to provide heat for cooking but will retain their shape and structure to serve thereafter as permanent briquettes. Such partially combustible briquettes are disclosed in Crace, U.S. Pat. No. 4,787,914, the disclosure of which is incorporated herein by reference.

The size of the briquettes of the invention may be any size suitable for use in preparing a bed of coals appropriate for cooking by radiant heat. It is preferred that the briquettes of the invention be the conventional size distributed in commerce, i.e., about 2 inches (51 millimeters) square by one to 1½ inches (25-38 mm) thick.

In order to prepare the briquettes of the invention, the pellets of aromatic material, preferably dense bonded wooden pellets, are added to the briquetting mix before the briquette is shaped and hardened. The pellets may be added to the briquette mix at any point in the mixing process. They are preferably added after at least one of the major ingredients, e.g., the charcoal, is added to the mixer in order to avoid breaking up the pellets. They may be added separately to the charcoal before it is added to the mixing device, or at any time during the mixing or transporting to the briquetting press.

The pellets of aromatic material thus are randomly distributed throughout the body of the briquette. Such random distribution is the preferred embodiment of the invention. However, embodiments in which the pellets may be distributed in a nonrandom manner, e.g., wherein more pellets are to be found near the surface of the briquette than toward the center, or vice versa, are not excluded from the scope of the invention. Such distributions may be useful when it is desired to provide a controlled release of aromatic volatiles over the course of the combustion of the briquette.

In use, the charcoal briquettes of this invention provide the advantages of cooking over a charcoal fire, i.e., efficient use of fuel, controlled burning, rapid formation of a bed of coals, elimination of excess smoke during formation of the bed of coals, and the like. However, the briquettes of this invention also provide the advantage of a sustained release of aromatic volatiles in amounts to impart the desirable smoked flavor and color to the meat throughout the entire period of combustion of the briquette. As the briquette burns from the surface inward, the pellets are pyrolyzed and/or ignited when the smoldering burning front reaches them. The burning pellets then release a smoke of wood volatiles which finds its way out of the briquette through cracks and rises to encounter and flavor the food being cooked on the grill. The aromatic volatiles escaping from the briquette also may be ignited to provide a play of flame over the bed of charcoal.

If the aromatic pellets are incorporated into noncombustible briquettes which are externally heated, the pellets will pyrolyze and burn, releasing their volatiles, when they become sufficiently heated by heat conducted from the surface of the briquette.

Food cooked over a bed of heated briquettes of the invention is flavored by exposure to aromatic volatiles released from the progressive pyrolysis of the pellets of aromatic material in the briquettes as the heat generated either internally by combustion of the charcoal or externally by a gas flame or electric heating element penetrates through the briquette.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

I claim:

1. A briquette capable of supplying aromatic volatile flavoring agents to food cooked over a bed of such briquettes comprising a bonded matrix containing within the matrix a plurality of dense compressed or bonded pellets containing an aromatic material which upon pyrolysis release a volatile aromatic flavoring material, whereby when said pellets are successively pyrolyzed said briquette provides a sustained release of said volatile aromatic flavoring material.

2. A briquette of claim 1 wherein said pellets are pellets of compressed wood.

3. A briquette of claim 2 wherein said pellets are comprised of a wood selected from the group consisting of hickory, mesquite, apple, oak, maple, alder, cherry, sassafras, birch, ash, willow and pine.

4. A briquette of claims 2 wherein said pellets consist essentially of a wood selected from the group consisting of hickory, mesquite, apple, oak, maple, alder, cherry, sassafras, birch, ash, willow and pine.

5. A briquette of claim 1 wherein said pellets are comprised of a combustible aromatic material selected from the group consisting of comminuted nuts, nutshells, spices and spice hulls.

6. A briquette of claim 1 wherein said pellets consist essentially of a combustible aromatic material selected from the group consisting of comminuted nuts, nutshells, spices and spice hulls.

7. A briquette of claim 1 wherein said matrix comprises comminuted charcoal and a binder.

8. A briquette of claim 1 wherein said matrix comprises a non-combustible substance and a heat-resistant binder.

9. A briquette of claim 1 wherein said matrix comprises a mixture of comminuted charcoal and clay.

10. A charcoal briquette capable of supplying wood volatiles to food cooked over a bed of such briquettes comprising a bonded matrix of charcoal containing within the matrix a plurality of dense compressed wood pellets which upon pyrolysis release a volatile aromatic flavoring material, whereby when said pellets are successively pyrolyzed said briquette provides a sustained release of said volatile aromatic flavoring material.

11. A briquette of claim 10 wherein said pellets are comprised of a wood selected from the group consisting of hickory, mesquite, apple, oak, maple, alder, cherry, sassafras, birch, ash, willow and pine.

12. A briquette of claim 10 wherein said pellets consist essentially of a wood selected from the group consisting of hickory, mesquite, apple, oak, maple, alder, cherry, sassafras, birch, ash, willow and pine.

13. A method of flavoring food cooked over a bed of briquettes by exposing the food to the action of volatile aromatic substances comprising providing briquettes comprising a bonded matrix containing within the matrix a plurality of dense compressed or bonded pellets containing an aromatic material which upon pyrolysis release a volatile aromatic flavoring material, whereby when said pellets are successively pyrolyzed said briquette provides a sustained release of said volatile aromatic flavoring material, forming a bed of said briquettes, heating said briquettes in said bed to a temperature at which they emit sufficient radiant heat to be used as a source of cooking heat and cooking food over said bed of briquettes.

14. The method of claim 13 wherein said pellets are comprised of compressed wood.

15. The method of claim 14 wherein said pellets are comprised of a wood selected from the group consisting of hickory, mesquite, apple, oak, maple, alder, cherry, sassafras, birch, ash, willow and pine.

16. The method of claim 13 wherein said pellets are comprised of a combustible aromatic material selected from the group consisting of comminuted nuts, nutshells, spices and spice hulls.

17. A method of flavoring food cooked over a bed of charcoal briquettes by exposing the food to the action of wood volatiles comprising providing charcoal briquettes comprising a bonded matrix of charcoal containing within the matrix a plurality of dense compressed wood pellets which upon pyrolysis release a volatile aromatic flavoring material where when said pellets are successively pyrolyzed said briquette provides a sustained release of said volatile aromatic flavoring material, forming a bed of coals by igniting a plurality of said charcoal briquettes, and cooking food over said bed of coals.

18. The method of claim 17 wherein said pellets of dense compressed wood are comprised of a wood selected from the group consisting of hickory, mesquite, apple, oak, maple, alder, cherry, sassafras, birch, ashy willow and pine.

* * * * *